(12) United States Patent
Taguchi et al.

(10) Patent No.: US 8,810,954 B1
(45) Date of Patent: Aug. 19, 2014

(54) DISK STORAGE APPARATUS, WRITE CONTROL APPARATUS AND WRITE CONTROL METHOD

(71) Applicant: Kabushiki Kaisha Toshiba, Tokyo (JP)

(72) Inventors: Tomoko Taguchi, Kunitachi (JP); Kenichiro Yamada, Tokyo (JP); Gaku Koizumi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/024,541

(22) Filed: Sep. 11, 2013

(30) Foreign Application Priority Data

Apr. 19, 2013 (JP) .................................. 2013-088436

(51) Int. Cl.
*G11B 21/02* (2006.01)
*G11B 5/02* (2006.01)
*G11B 5/127* (2006.01)

(52) U.S. Cl.
USPC ............................. 360/75; 360/55; 360/125.3

(58) Field of Classification Search
None
See application file for complete search history.

(56) References Cited

U.S. PATENT DOCUMENTS

| 7,969,678 B2 | 6/2011 | Tanabe et al. |
| 8,027,118 B2 | 9/2011 | Ezawa et al. |
| 8,270,112 B2 * | 9/2012 | Funayama et al. ........ 360/125.31 |
| 2012/0113543 A1 | 5/2012 | Shiimoto et al. |

FOREIGN PATENT DOCUMENTS

| JP | 2010-123233 | 6/2010 |
| JP | 2011-113621 | 6/2011 |
| JP | 2012-053950 | 3/2012 |
| JP | 2012-104191 | 5/2012 |

* cited by examiner

*Primary Examiner* — Andrew L Sniezek
(74) *Attorney, Agent, or Firm* — Knobbe, Martens, Olson & Bear, LLP (57) ABSTRACT

According to one embodiment, a disk storage apparatus includes a magnetic head and a controller. The controller determines at regular intervals whether a recording density of a write signal belongs to a low-density region or a high-density region with reference to a reference density. In addition, the controller relatively reduces a current to energize a high-frequency-assisted element at a timing of the low-density region to be less than a current of the high-density region, in accordance with the low-density region or the high-density region in recording the data.

10 Claims, 10 Drawing Sheets

F I G. 11

DISK STORAGE APPARATUS, WRITE CONTROL APPARATUS AND WRITE CONTROL METHOD

CROSS-REFERENCE TO RELATED APPLICATIONS

This application is based upon and claims the benefit of priority from Japanese Patent Application No. 2013-088436, filed Apr. 19, 2013, the entire contents of which are incorporated herein by reference.

FIELD

Embodiments described herein relate generally to a disk storage apparatus, a write control apparatus, and a write control method, with a high-frequency-assisted writing function.

BACKGROUND

Nowadays, in the field of magnetic disk storage apparatuses (hereinafter also referred to as "disk drives") such as hard disk drives, high recording density and high recording capacity have been achieved by the development of perpendicular magnetic recording and high-frequency-assisted writing.

High-frequency-assisted writing is a recording method of applying a high-frequency magnetic field to a magnetic disk by using a magnetic head including a high-frequency-assisted element. As the high-frequency-assisted element, for example, a spin-torque oscillator (STO) is widely noticed. The disk drive supplies a direct current to the STO through an electrode, thereby drives the STO as oscillation source and generates a high-frequency magnetic field.

In a magnetic disk apparatus using an STO, a direct energizing current is always supplied to the STO in recording data in which a write operation is performed. The write signal input to the magnetic head in recording data includes a relatively low-density region and a relatively high-density region. It has been found that a bit error rate (BER) of data recorded on the disk deteriorates, in write operation in response to a write signal of a low-density region.

When the disk drive supplies a direct current to the STO and records data on the disk, it is inferred that the deterioration in the bit error rate is caused by influence of oscillation of the STO element on a trailing shield disposed on a trailing side of the STO and occurrence of a magnetic field of a direction reverse to that of the main pole in a low-density region. Specifically, it is inferred that the deterioration is caused by increase in the magnetic field of a direction reverse to the magnetic field directly under the main pole, in under the trailing shield and thus disturbance of magnetization of the recording pattern after recording.

DETAILED DESCRIPTION

In general, according to one embodiment, a disk storage apparatus includes a magnetic head and a controller. The magnetic head includes a main pole and a high-frequency-assisted element, generates a write magnetic field, from the main pole, to perform perpendicular magnetic recording on a magnetic disk in response to a write signal input, and applies a high-frequency magnetic field on the basis of the high-frequency-assisted element to the magnetic disk in recording data. The controller determines at regular intervals whether a recording density of the write signal belongs to a low-density region or a high-density region with reference to a reference density. In addition, the controller relatively reduces a current to energize the high-frequency-assisted element at a timing of the low-density region to be less than a current of the high-density region, in accordance with the low-density region or the high-density region in recording the data.

Various embodiments will be described hereinafter with reference to the accompanying drawings.

First Embodiment

First, a configuration of a disk drive according to the present embodiment will be explained hereinafter with reference to FIG. 1. The configuration of the disk drive illustrated in FIG. 1 is also applicable to second and third embodiments described below.

Figure 1:
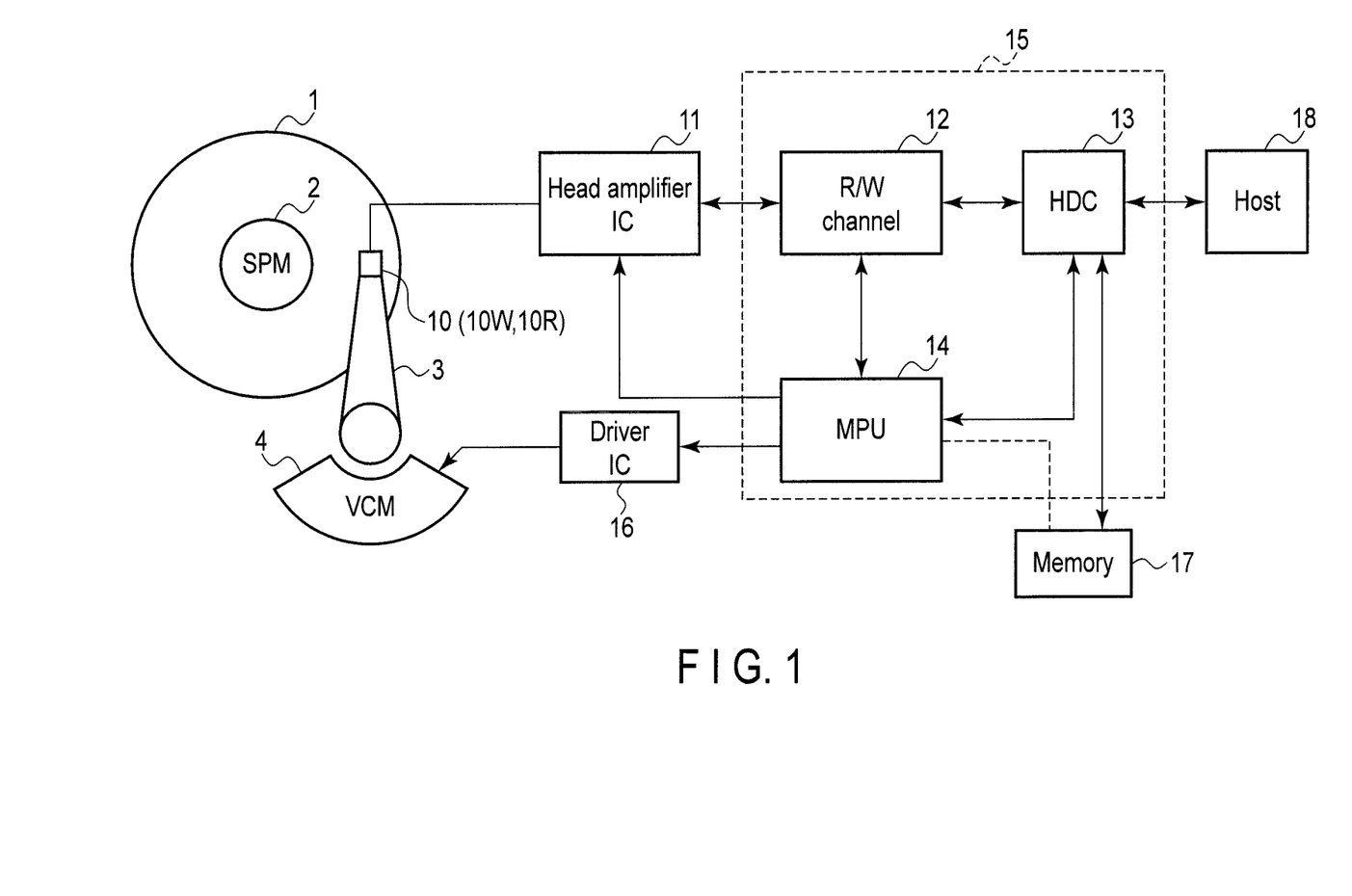
FIG. 1 is a block diagram for explaining a configuration of a disk drive according to a first embodiment.

As illustrated in FIG. 1, the disk drive is a magnetic disk apparatus of a perpendicular magnetic recording method, which includes a magnetic disk (hereinafter simply referred to as "disk") 1 which is a medium of a perpendicular magnetic recording method, and a magnetic head (hereinafter simply referred to as "head") 10 including a high-frequency-assisted element (STO) described below.

The disk 1 is fixed to a spindle motor (SPM) 2, and attached thereto to perform a rotary motion. The head 10 is mounted to an actuator 3, and configured to move in a radial direction on the disk 1. The actuator 3 is rotated and driven by a voice coil motor (VCM) 4. The head 10 includes a write head 10W and a read head 10R.

The disk drive also includes a head-amplifier integrated circuit (hereinafter referred to as "head amplifier IC") 11, a read/write channel (R/W channel) 12, a hard disk controller (HDC) 13, a microprocessor (MPU) 14, a driver IC 16, and a memory 17. The R/W channel 12, the HDC 13, and the MPU 14 are incorporated into a controller 15 formed of a one-chip integrated circuit.

The head amplifier IC 11 includes circuits to drive a spin-torque oscillator (STO) being a high-frequency-assisted element. The high-frequency-assisted element is referred to as an "STO" hereinafter. The head amplifier IC 11 also includes a driver, which supplies a write signal (write current) corresponding to write data supplied from the R/W channel 12 to the write head 10W. The head amplifier IC 11 also includes a read amplifier, which amplifies a read signal output from the read head 10R and transmits the amplified read signal to the R/W channel 12.

The R/W channel 12 is a circuit for processing signals of read/write data. The HDC 13 serves as an interface between the disk drive and a host 18, and controls transmission of the read/write data. The MPU 14 executes control of read/write operations and servo control necessary for positioning the magnetic head 10. The MPU 14 also executes energizing control for the STO according to the present embodiment. The memory 17 includes a buffer memory formed of a DRAM, and a flash memory.

Figure 2:
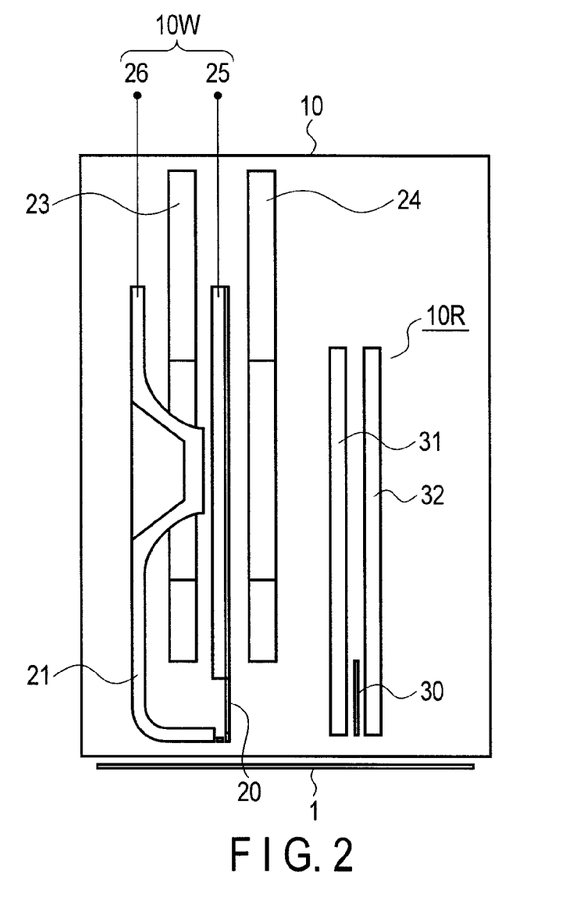
FIG. 2 is a cross-sectional view for explaining a structure of a head according to the first embodiment.
Figure 3:
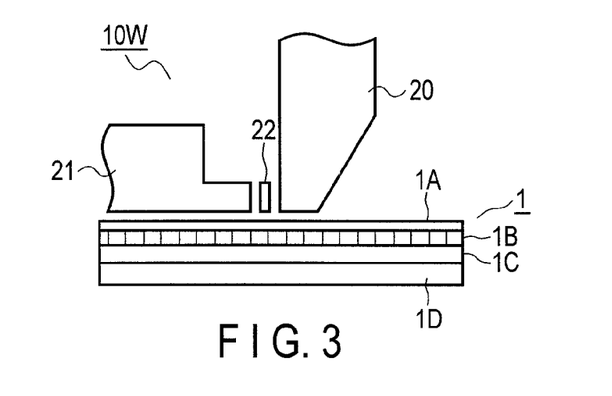
FIG. 3 is a diagram for explaining the positional relationship of a high-frequency-assisted element according to the first embodiment.

FIG. 2 is a diagram illustrating a structure of the head 10. FIG. 3 is a diagram illustrating the positional relationship of the STO 22 mounted to the write head 10W.

First, as illustrated in FIG. 2, the head 10 has a structure in which the write head 10W and the read head 10R are separated from each other and embedded in the same slider. The slider includes an ABS (air bearing surface) to float to be opposed to a recording surface of the disk 1. The write head 10W includes a magnetic core including a main pole 20 and a return magnetic pole (trailing shield) 21. The main pole 20 is formed of a soft magnetic material. The magnetic core forms a magnetic path formed of the main pole 20 and the return magnetic pole 21, and has a magnetic gap between the main pole 20 and the return magnetic pole 21 in ten ABS surface opposed to the recording surface of the disk 1.

In addition, in the write head 10W, terminals 25 and 26 are connected to let a direct current flow through the main pole 20, the STO 22, and the return magnetic pole 21 in series. In addition, a first write coil 23 and a second write coil 24 are arranged to be wound around the magnetic core. The second write coil 24 is disposed on the reading side of the main pole 20. The read head 10R is disposed on the reading side of the write head 10W. The read head 10R includes an MR element 30, and a pair of shields 31 and 32. The shields 31 and 32 are arranged to hold the MR element 30 there between before and after a direction of running the head 10.

In addition, as illustrated in FIG. 3, the STO 22 is mounted in the gap of the magnetic core of the write head 10W. The STO 22 is disposed on the ABS side to be opposed to the recording surface of the disk 1. In the write head 10W, a direct current flows through the main pole 20, the STO 22, and the return magnetic pole 21 in this order. The disk 1 includes an under layer 1C as the upper layer of a substrate 1D, a recording layer 1B, and a protective film 1A as the upper layer of the recording layer 1B. The recording layer 1B is a magnetic recording layer having magnetic anisotropy of perpendicular magnetization.

[Write Control]

Figure 4:
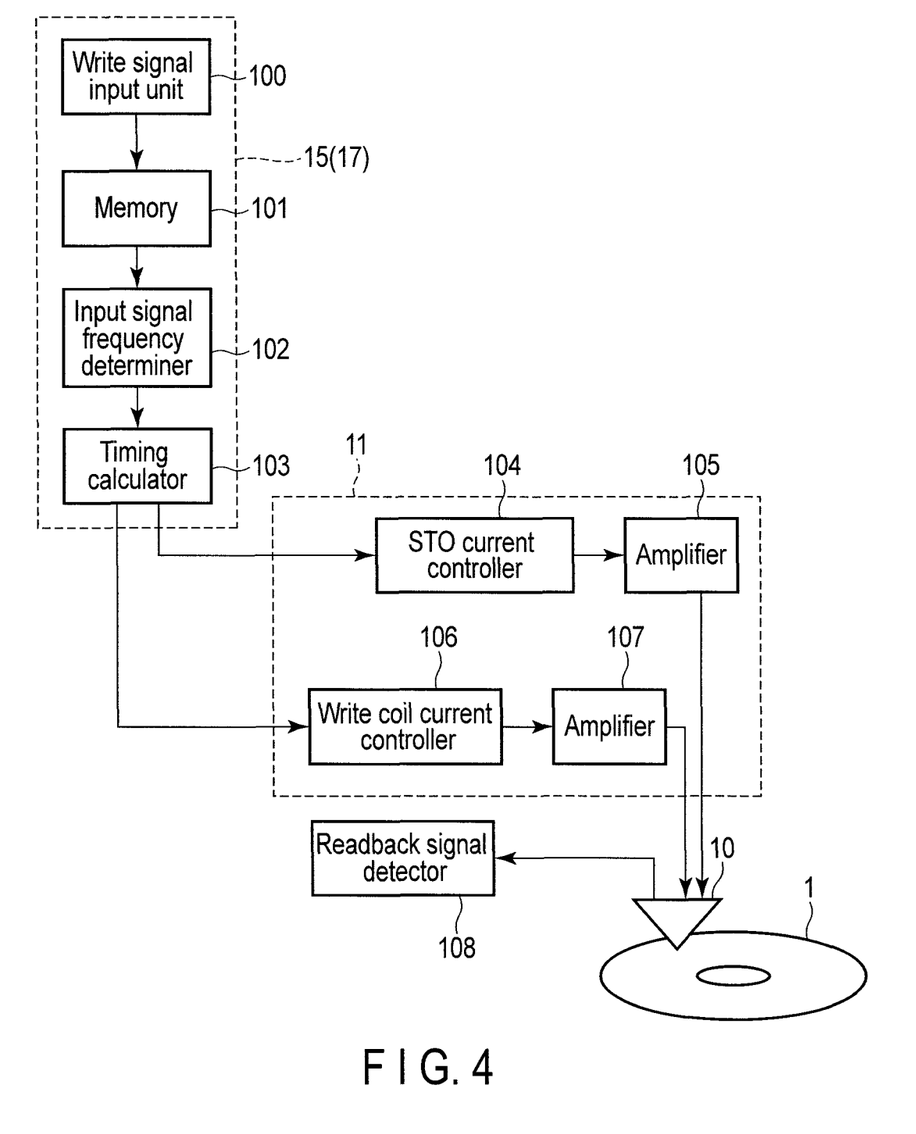
FIG. 4 is a block diagram for explaining a structure of a write controller according to the first embodiment.

FIG. 4 is a block diagram illustrating a configuration achieving a write control function in the disk drive according to the present embodiment. Specifically, the write control function is achieved by the head amplifier IC 11, the controller 15, and the memory 17. The configuration illustrated in FIG. 4 will be referred to as write controller hereinafter.

As illustrated in FIG. 4, the write controller includes a write signal input unit 100, a memory 101, an input signal frequency determiner 102, and a timing calculator 103. The write signal input unit 100 is a function realized by the R/W channel 12. The write signal is write data transmitted from the HDC 13 and recorded on the disk 1.

The memory 101 is, for example, a DRAM included in the memory 17. The memory 101 temporarily stores a write signal (write data). The input signal frequency determiner 102 and the timing calculator 103 are realized by the MPU 14 included in the controller 15. The input signal frequency determiner 102 determines a frequency of a write signal serving as a basis of switching an energizing current magnitude (energizing level) for the STO 22 provided by the STO current controller 104. The timing calculator 103 sets a timing to synchronize the phase of the write current waveform provided by the write coil current controller 106 with the phase of the energizing current waveform provided by the STO current controller 104.

The write controller also includes a first amplifier 105, a second amplifier 107, and a readback signal detector 108, as well as the STO current controller 104 and the write coil current controller 106. The STO current controller 104, the write coil current controller 106, and the first and second amplifiers 105 and 107 are functions achieved by the head amplifier IC 11. The readback signal detector 108 is a function achieved by the head amplifier IC 11 and the R/W channel 12.

The STO current controller 104 generates an energizing current waveform for the STO 22. The first amplifier 105 amplifies the energizing current and supplies the amplified energizing current to the STO 22. The write coil current controller 106 generates a write current waveform to supply an energizing alternating current to the first write coil 23 and the second write coil 24. The second amplifier 107 amplifies the energizing alternating current, and supplies the amplified energizing alternating current to the first and second write coils 23 and 24. The readback signal detector 108 detects a readback signal (read data) from a read signal read from the disk 1 by the head 10.

The write control according to the present embodiment will be explained hereinafter, with reference to the flowchart of FIG. 5, and FIG. 6A to FIG. 6C and FIG. 7.

Figure 5:
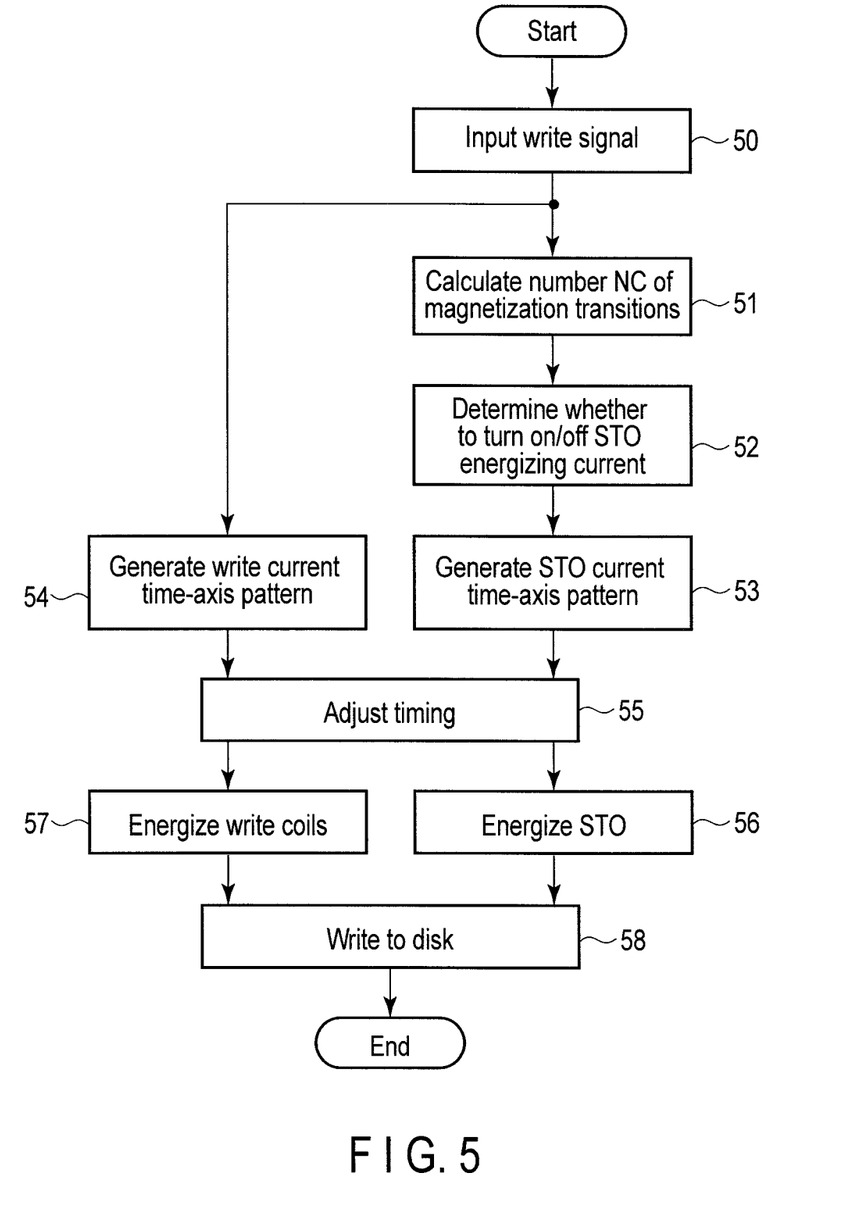
FIG. 5 is a flowchart for explaining write control according to the first embodiment.

First, as illustrated in FIG. 5, when write operation is started, the write signal input unit 100 inputs a write signal corresponding to the write data from the HDC 13 (Block 50). The write controller temporarily stores the input write signal in the memory 101, and executes processing relating to write current control and STO current control as described below (Block 51 to Block 55).

Figure 6A:
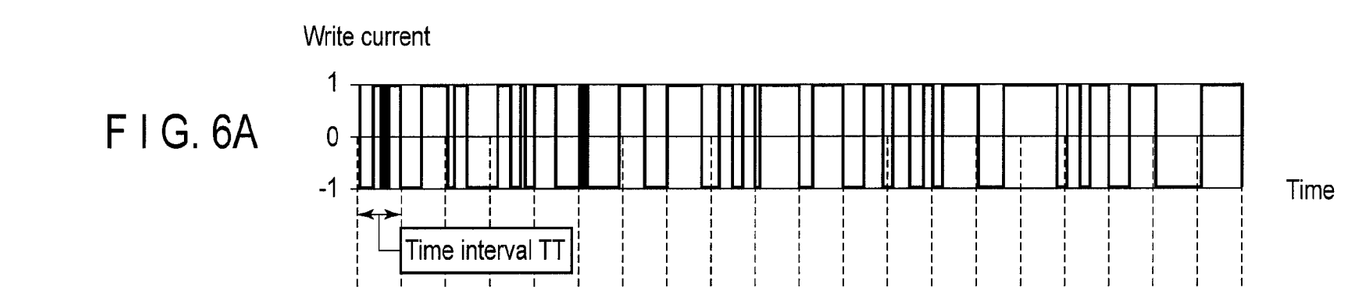
FIG. 6A, FIG. 6B, and FIG. 6C are timing charts for explaining write control according to the first embodiment.

Specifically, the write controller generates a write current time-axis pattern corresponding to the stored write signal (Block 54). The write current time-axis pattern is, for example, a write current waveform as illustrated in FIG. 6A. The write controller supplies the generated write current waveform to the write coil current controller 106, after the timing with the STO write current waveform is adjusted by the timing calculator 103 (Block 55). The write coil current controller 106 supplies a current corresponding to the write current waveform to the first and second write coils 23 and 24 via the second amplifier 107 (Block 57).

Figure 6B:
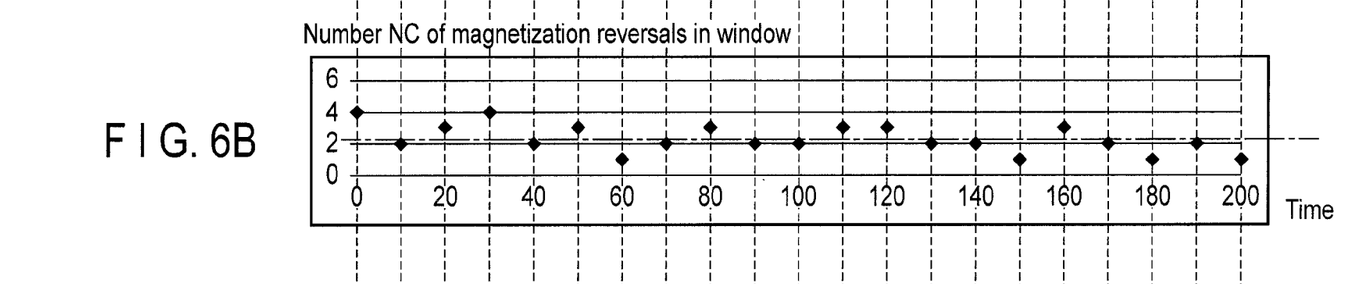
Figure 6C:
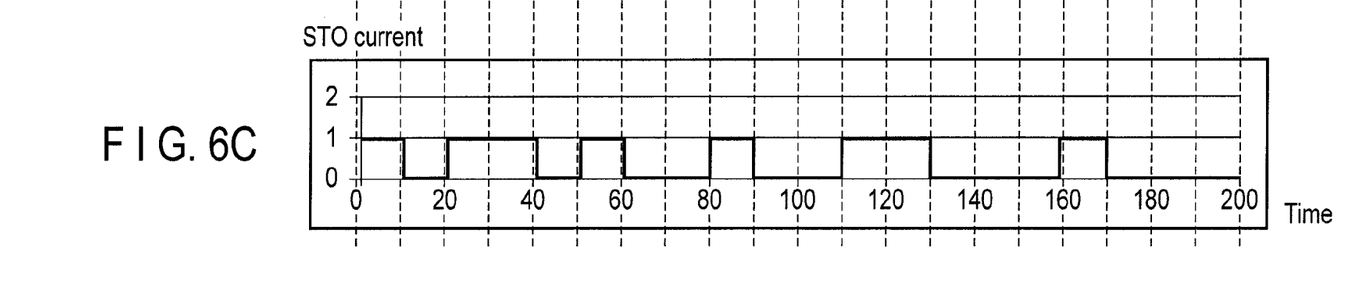

On the other hand, in the write controller, the input signal frequency determiner 102 determines a low-density region having a relatively low recording density and a high-density region having a relatively high recording density, in the write current time-axis pattern (write current waveform), based on the frequency of the stored write signal. Specifically, the input signal frequency determiner 102 determines a low-density region and a high-density region, based on an average frequency in a fixed time interval TT (for example, in each sector) described below. Specifically, as illustrated in FIG. 6B, the input signal frequency determiner 102 calculates the number of NC magnetization reversals (the number of magnetization transitions) in a fixed time interval TT (window) of the write current waveform (Block 51). In addition, the input signal frequency determiner 102 compares the calculated number NC of magnetic transitions with a reference value (for example, two), and determines that the region is a low-density region when the number NC is less than or equal to the reference value, and determines that the region is a high-density region when the number NC exceeds the reference value (Block 52). Specifically, the input signal frequency determiner 102 calculates an STO current waveform, in which an energizing direct current for the STO 22 is turned off in a low-density region and turned on in a high-density region. The write controller generates an STO current time-axis pattern corresponding to the calculated STO current waveform (Block 53). The STO current time-axis pattern is, for example, a write current waveform as illustrated in FIG. 6C.

The write controller supplies the STO current waveform corresponding to the STO current time-axis pattern to the STO current controller 104 after the timing calculator 103 adjusts timing with the write current waveform, as described above. The STO current controller 104 supplies an energizing direct current to the STO 22 via the first amplifier 105, in accordance with the STO current waveform (Block 56). Thereby, the write head 10W executes perpendicular magnetic recording on the disk 1 in accordance with the write current waveform, at the timing at which a high-frequency magnetic field is applied from the STO 22 (Block 58).

As described above, according to the write controller of the present embodiment, write data corresponding to a write signal can be recorded on the disk 1 by perpendicular magnetic recording, at a timing at which a high-frequency magnetic field is applied from the STO 22. In this case, according to the present embodiment, it is determined whether the region is a low-density region having a low recording density or a high-density region having a high recording density, based on the frequency of the write current waveform being a write signal, and the energizing current (energizing level) for the STO 22 is changed based on a result of the determination. Specifically, the energizing current for the STO 22 is turned off in a low-density region having a low recording density. The energizing current for the STO 22 is maintained in the on-state in a high-density region having a high recording density.

In the write control of the present embodiment, although the energizing current (energizing level) for the STO 22 is turned off in the low-density region, the energizing current may be adjusted to be low for the STO current in the on-state.

Figure 7:
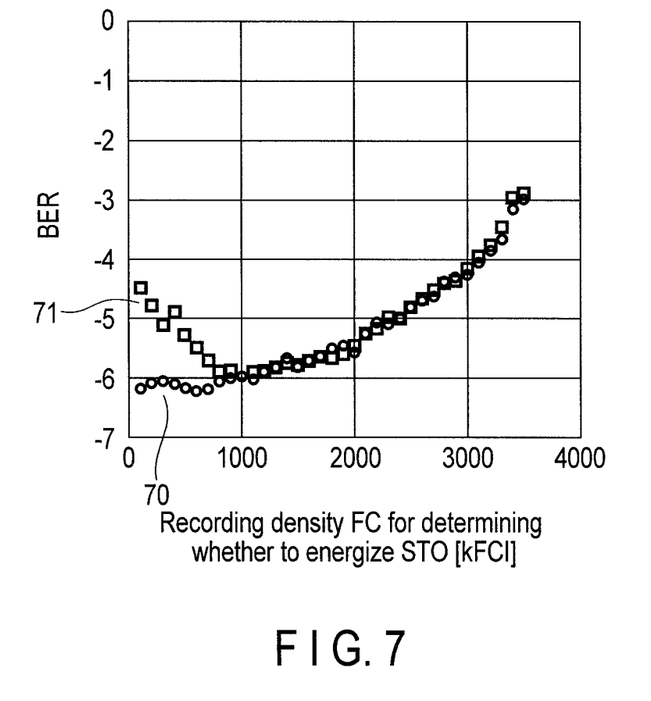
FIG. 7 is a diagram for explaining effects according to the first embodiment.

FIG. 7 is a diagram illustrating effects of the present embodiment. Specifically, FIG. 7 illustrates measurements results of bit error rates (BER) obtained when data recorded on the disk 1 with varied energizing currents for the STO 22 is played back. Specifically, FIG. 7 illustrates BER obtained when the frequency determination value FC corresponding to the recording density in the fixed time interval TT of the write current waveform is varied. The results show that a characteristic 71 of the BER deteriorates when the STO current is turned on in the low-density region and the energizing direct current is maintained for the STO. On the other hand, the results show that a characteristic 70 of the BER does not relatively deteriorate when the STO current is turned off or made low.

In short, according to the present embodiment, the energizing direct current for the STO 22 is turned off or made low in magnetic recording in a low-density region, and thereby the read error rate (bit error rate [BER]) for the magnetic recording can be reduced. This structure achieves sure perpendicular magnetic recording, without being restricted by the recording density region.

Second Embodiment

Figure 8:
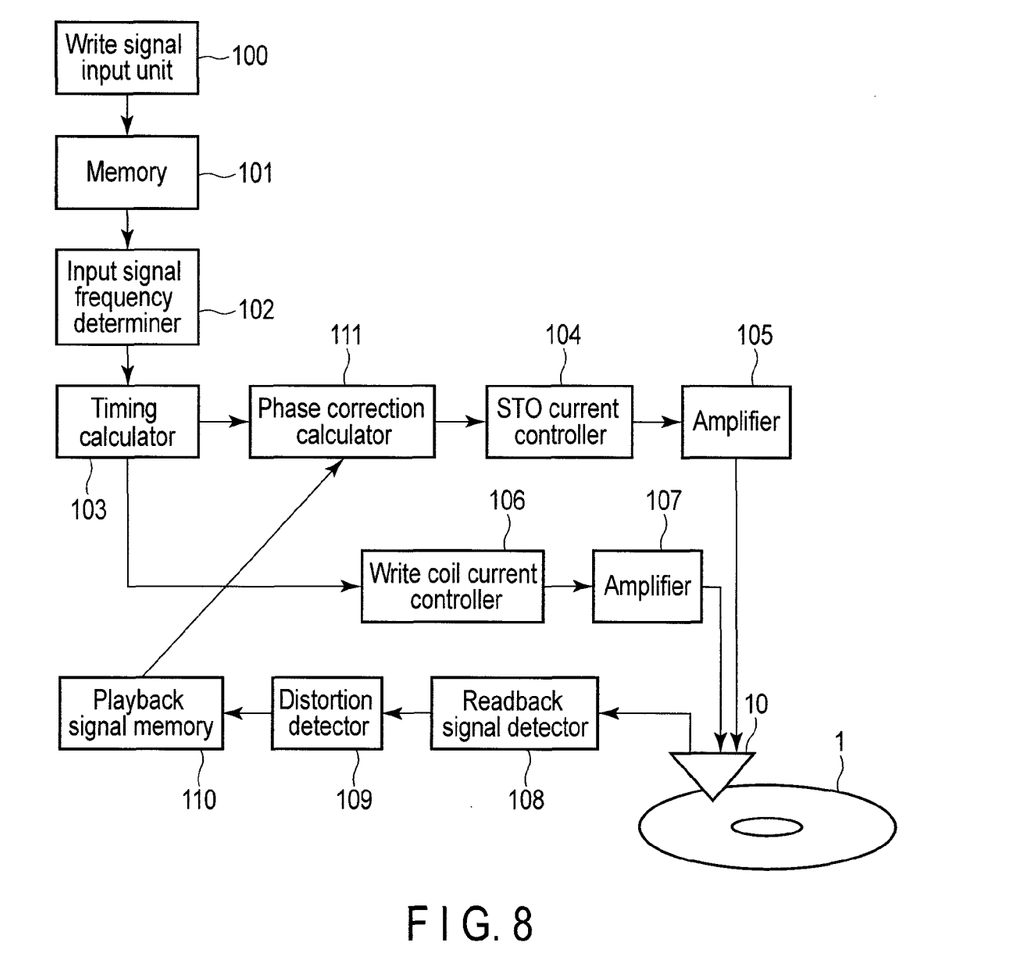
FIG. 8 is a block diagram for explaining a configuration of a write controller according to a second embodiment.

FIG. 8 is a block diagram of a configuration of a write controller that achieves a write control function according to a second embodiment. The structure of a disk drive of the second embodiment is the same as those illustrated in FIG. 1 to FIG. 3, and explanation thereof is omitted.

The present embodiment provides a write controller that has the structure illustrated in FIG. 4, and further includes a distortion detector 109, a readback signal memory 110, and a phase correction calculator 111. The same constituent elements as those illustrated in FIG. 4 are denoted by the same respective reference numerals, and explanation thereof is omitted.

The distortion detector 109 detects a distortion of a readback signal waveform detected from a disk 1 by a readback signal detector 108. The readback signal memory 110 is a memory that stores the readback signal including the distortion. The phase correction calculator 111 corrects a phase of the STO current waveform, timing of which is adjusted in synchronization with the recording current waveform by the timing calculator 103, based on the readback signal including the distortion and stored in the readback signal memory 110.

Write control according to the present embodiment will be explained hereinafter, with reference to FIGS. 9A to 9F and FIGS. 10A to 10F.

Also in the present embodiment, an input signal frequency determiner 102 calculates an STO current waveform, in which an energizing direct current for the STO 22 is turned off in a low-density region and turned on in a high-density region. The write controller supplies the STO current waveform corresponding to the STO current time-axis pattern to a STO current controller 104 after timing with the write current waveform is adjusted, as described above. The STO current controller 104 supplies an energizing direct current corresponding to the STO current waveform to the STO 22 via a first amplifier 105. Thereby, a write head 10W executes perpendicular magnetic recording on the disk 1 in accordance with the write current waveform, at a timing at which a high-frequency magnetic field is applied from the STO 22 (see FIG. 6A, FIG. 6B, and FIG. 6C).

When a read error occurs in read operation, an ordinary disk drive executes read retry operation being a second read operation. In the present embodiment, the distortion detector 109 detects a distortion of the readback signal waveform played back from the disk 1 by the readback signal detector 108, before the read retry operation. Specifically, the distortion detector 109 detects a distortion of the readback signal waveform in which the read error has occurred. The readback signal memory 110 stores the readback signal including the detected distortion.

Figure 9A:
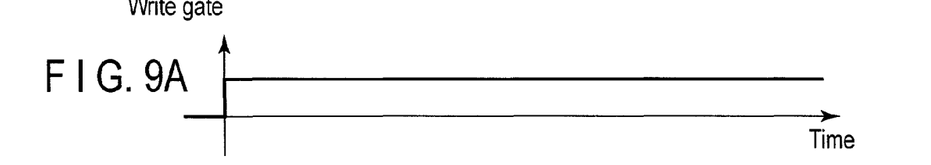
FIG. 9A, FIG. 9B, FIG. 9C, FIG. 9D, FIG. 9E, and FIG. 9F are timing charts for explaining write control according to the second embodiment.
Figure 9B:
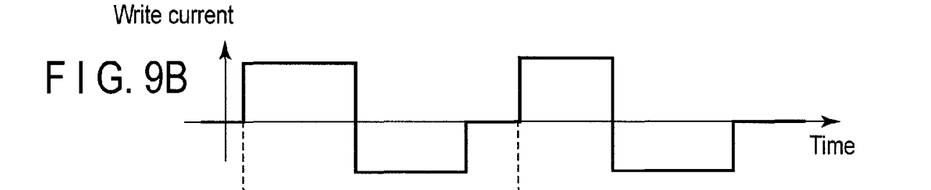
Figure 9C:
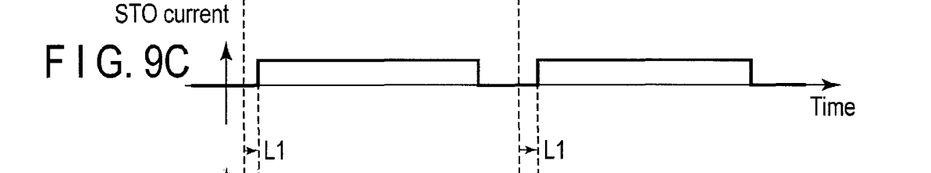

Next, when write operation is started, the write controller executes operation of supplying the STO current waveform corresponding to the STO current time-axis pattern to the STO current controller 104 after the timing with the write current waveform is adjusted, as described above. Specifically, the write controller generates a write current waveform being a write current time-axis pattern corresponding to the write signal, in synchronization with the write gate illustrated in FIG. 9A. FIG. 9B illustrates a write current waveform in a low-density region having a low recording density. In the operation, the write controller generates an STO current waveform being an STO current time-axis pattern, based on the frequency of the write signal. FIG. 9C illustrates an STO current waveform in which the STO current corresponding to the write current waveform of a low-density region is low.

Figure 9D:
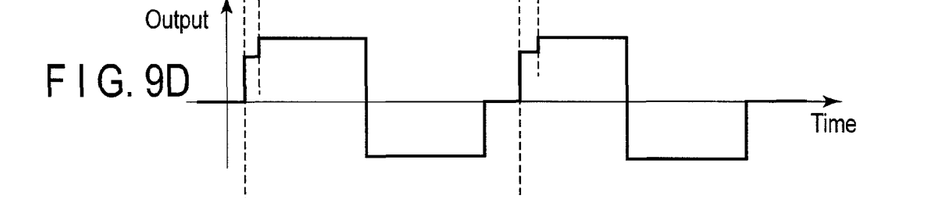

In the operation, as illustrated in FIG. 9C, the current rise of the STO current waveform is delayed by time L1 from the write current rise of the write current waveform illustrated in FIG. 9B. When perpendicular magnetic recording corresponding to the write current waveform accompanying the high-frequency magnetic field from the STO 22 is performed in a state where a phase difference exists between the write current waveform and the STO current waveform like this, the readback signal waveform may include a distortion. Specifically, as illustrated in FIG. 9D, the readback signal waveform (output waveform) played back by the readback signal detector 108 includes a distortion based on the phase difference (delay by time L1).

Figure 9E:
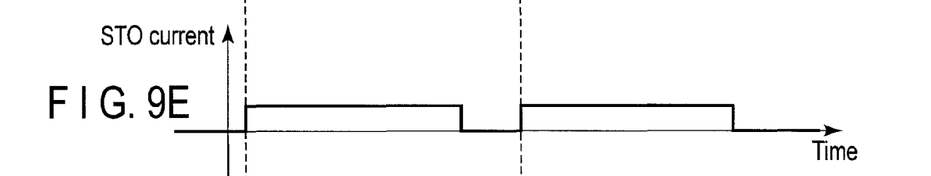
Figure 9F:
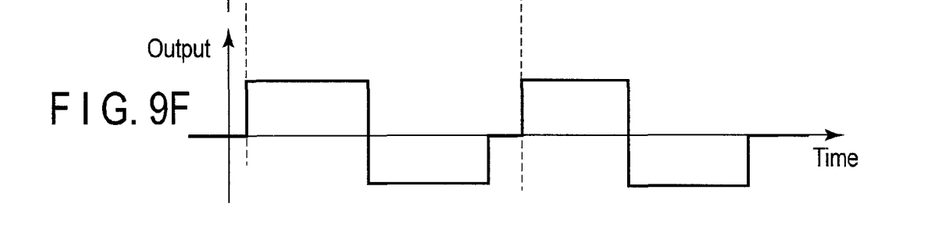

Thus, the phase correction calculator 111 corrects the phase of the STO current waveform, timing of which has been adjusted to match the phase thereof with the phase of the write current waveform by the timing calculator 103, based on the readback signal stored in the readback signal memory 110 and including the distortion. Specifically, as illustrated in FIG. 9E, the phase correction calculator 111 performs correction to match the current rise of the STO current waveform with the write current rise of the write current waveform. In this case, the phase correction calculator 111 changes the phase difference of the STO current waveform, based on correlation with the distortion of the readback signal detected by the distortion detector 109, and thereby can calculate the timing of the STO current waveform, at which the delay time L1 is 0. As a result, as illustrated in FIG. 9F, it is possible to remove the distortion based on the phase difference from the readback signal waveform (output waveform) played back by the readback signal detector 108.

Figure 10A:
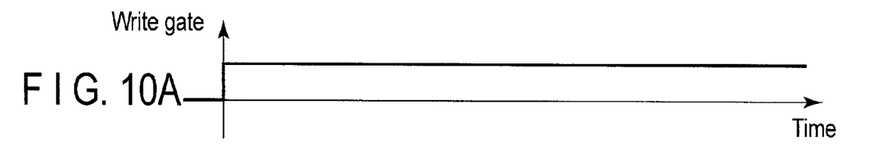
FIG. 10A, FIG. 10B, FIG. 10C, FIG. 10D, FIG. 10E, and FIG. 10F are timing charts for explaining another write control according to the second embodiment.
Figure 10B:
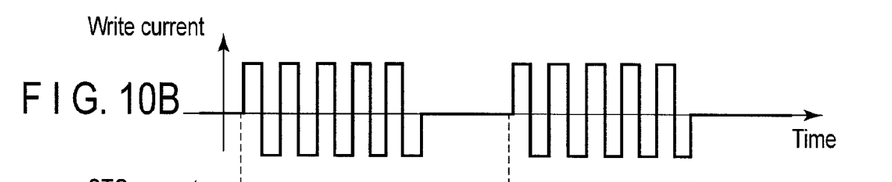
Figure 10C:
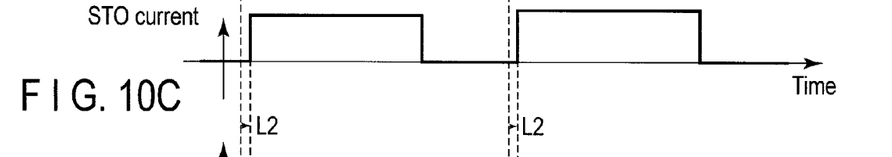
Figure 10D:
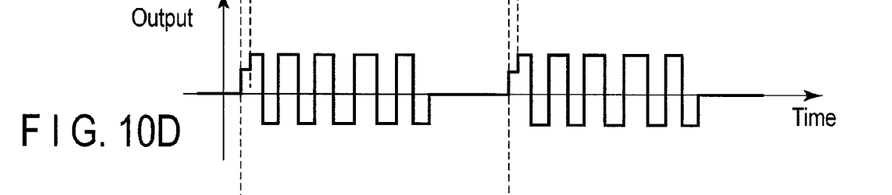

On the other hand, in synchronization with the write gate illustrated in FIG. 10A, the write controller generates a write current waveform of a high-density region having a high recording density, as illustrated in FIG. 10B. In the operation, the write controller generates an STO current waveform corresponding to the write current waveform of the high-density region, based on the frequency of the write signal. As illustrated in FIG. 10C, the current rise of the STO current waveform is delayed by time L2 from the write current rise of the write current waveform. When perpendicular magnetic recording corresponding to the write current waveform accompanying the high-frequency magnetic field from the STO 22 is performed in a state where a phase difference exists between the write current waveform and the STO current waveform like this, the readback signal waveform may include a distortion. Specifically, as illustrated in FIG. 10D, the readback signal waveform (output waveform) played back by the readback signal detector 108 includes a distortion based on the phase difference (delay by time L2).

Figure 10E:
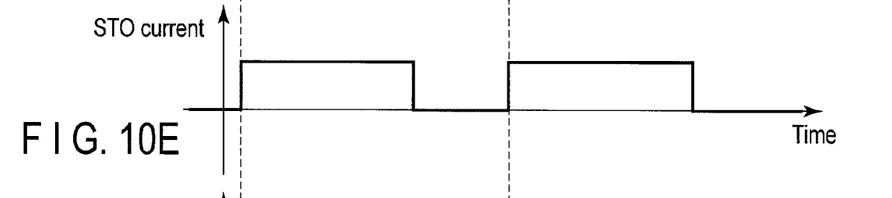
Figure 10F:
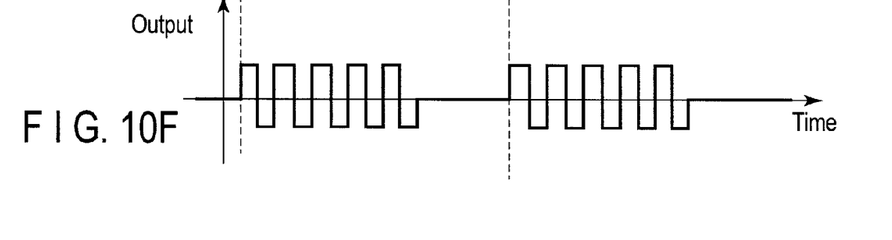

Thus, the phase correction calculator 111 corrects the phase of the STO current waveform, timing of which has been adjusted to match the phase thereof with the phase of the write current waveform by the timing calculator 103, based on the readback signal stored in the readback signal memory 110 and including the distortion. Specifically, as illustrated in FIG. 10E, the phase correction calculator 111 performs correction to match the current rise of the STO current waveform with the write current rise of the write current waveform. As a result, as illustrated in FIG. 10F, it is possible to remove the distortion based on the phase difference from the readback signal waveform (output waveform) played back by the readback signal detector 108.

As described above, according to the present embodiment, the distortion detector 109 detects a distortion of the readback signal waveform, for example, before read retry operation accompanying occurrence of a read error. When the distortion of the readback signal waveform is caused by a phase difference between the write current waveform and the STO current waveform, the phase difference between the write current waveform and the STO current waveform can be removed, based on correlation with the distortion of the readback signal, in write operation. Thus, the present embodiment can reduce the readback error rate (BER) caused by the STO operation in a low-density region, and remove a distortion in the readback signal waveform caused by a phase difference between the write current waveform and the STO current waveform. Thereby, sure perpendicular magnetic recording is achieved.

Third Embodiment

Figure 11:
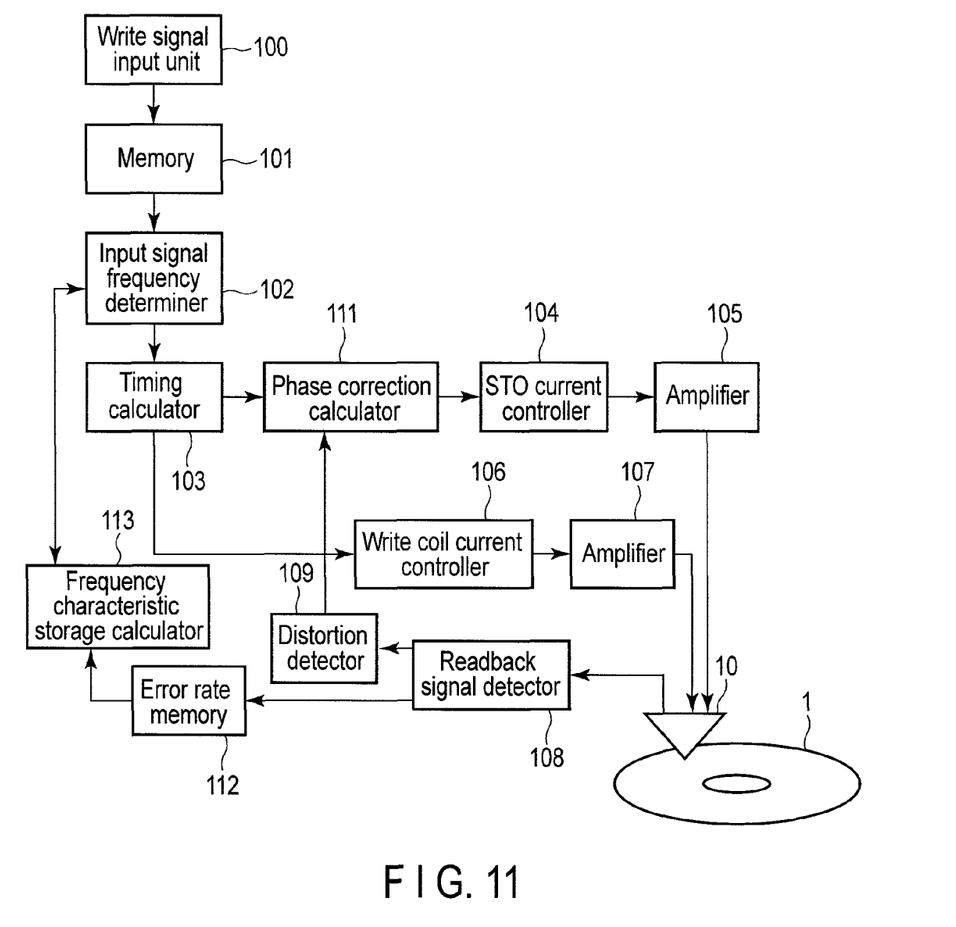
FIG. 11 is a block diagram for explaining a configuration of a write controller according to a third embodiment.

FIG. 11 is a block diagram illustrating a write controller that achieves a write control function according to a third embodiment. The structure of a disk drive in the third embodiment is the same as those illustrated in FIG. 1 and FIG. 3, and explanation thereof is omitted.

The present embodiment provides a write controller that has the structure illustrated in FIG. 8, and further includes an error rate memory 112 and a frequency characteristic storage calculator 113. The same constituent elements as those illustrated in FIG. 8 are denoted by the same respective reference numerals, and explanation thereof is omitted.

In the present embodiment, the frequency characteristic storage calculator 113 has a function of adjusting a frequency determination value (boundary frequency) FC corresponding to a recording density serving as basis for determining whether to turn on or off the STO energizing current in the input signal frequency determiner 102. The frequency characteristic storage calculator 113 stores data indicating the relationship between the boundary frequency FC and the readback error rate. The error rate memory 112 stores data indicating the readback error rate calculated based on an error of the readback signal waveform played back by the readback signal detector 108.

The frequency characteristic storage calculator 113 stores relationship data indicating the relationship between the boundary frequency FC and the readback error rate stored in the error rate memory 112. The frequency characteristic storage calculator 113 sets an optimum boundary frequency FC, which has the most excellent readback error rate, in the input signal frequency determiner 102, based on the stored relationship data. Thereby, the input signal frequency determiner 102 can determine the STO current waveform, in which turning on/off of the STO energizing current is controlled, based on the boundary frequency FC with the most excellent read error rate.

For a phase difference between the write current waveform and the STO current waveform, a phase correction calculator 111 can remove the phase difference between the write current waveform and the STO current waveform, in the same manner as the second embodiment, in write operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
   a magnetic head including a main pole and a high-frequency-assisted element, the magnetic head configured to generate a write magnetic field, from the main pole, to perform perpendicular magnetic recording on a magnetic disk in response to a input write signal, and apply a high-frequency magnetic field on the basis of the high-frequency-assisted element to the magnetic disk in recording data; and a controller configured to determine at regular intervals whether a recording density of the write signal belongs to a low-density region or a high-density region with reference to a reference density; and relatively reduce a current to energize the high-frequency-assisted element at a timing of the low-density region to be less than a current of the high-density region, in accordance with the low-density region or the high-density region in recording the data.

2. The disk storage apparatus of claim 1, wherein
the controller is configured to determine whether a region is the low-density region or the high-density region, based on an average frequency of the write signal for each of the regular intervals.

3. The disk storage apparatus of claim 1, wherein
the controller is configured to adjust a timing between a write current waveform corresponding to the write signal and an energizing current waveform to energize the high-frequency-assisted element, and supply a current to the magnetic head.

4. The disk storage apparatus of claim 3, wherein the controller is configured to:
turn off an energizing current supplied to the high-frequency-assisted element at the timing of the low-density region; and
turn on the energizing current supplied to the high-frequency-assisted element at a timing of the high-density region.

5. The disk storage apparatus of claim 3, further comprising:
a first detector configured to detect a readback signal from the disk by using the magnetic head; and
a second detector configured to detect a distortion of the readback signal,
wherein the controller is configured to adjust a phase difference between the write current waveform and the energizing current waveform, based on the distortion of the readback signal.

6. The disk storage apparatus of claim 1, further comprising:
a first detector configured to detect a readback signal from the disk by using the magnetic head; and
a calculator configured to calculate an error rate of the readback signal,
wherein the controller is configured to adjust a boundary frequency to determine the low-density region or the high-density region, and calculate an optimum boundary frequency based on the relationship between the error rate and the boundary frequency.

7. A write control apparatus in a disk storage apparatus including a magnetic head configured to apply a high-frequency magnetic field from a high-frequency-assisted element to a magnetic disk in recording data on the magnetic disk, the write control apparatus comprising:
a first device configured to let a current corresponding to a write signal flow through a write coil of the magnetic head;
a second device configured to let a current flow through the high-frequency-assisted element; and
a controller configured to relatively reduce a current to energize the high-frequency-assisted element in a low-density region to be less than a current of a high-density region, in accordance with the low-density region or the high-density region of the write signal.

8. The write control apparatus of claim 7, wherein
the controller is configured to determine whether a region is the low-density region or the high-density region based on an average frequency of the write signal for each of regular intervals.

9. The write control apparatus of claim 7, wherein
the controller is configured to adjust a timing between a write current waveform corresponding to the write signal and an energizing current waveform to energize the high-frequency-assisted element, and supply a current to the magnetic head.

10. A method of write control in a disk storage apparatus including a magnetic head, the magnetic head including a main pole and a high-frequency-assisted element, the magnetic head configured to generate a write magnetic field, from the main pole, to perform perpendicular magnetic recording on a magnetic disk in response to a input write signal, and apply a high-frequency magnetic field on the basis of the high-frequency-assisted element to the magnetic disk in recording data, the method comprising:
determining at regular intervals whether a recording density of the write signal belongs to a low-density region or a high-density region with reference to a reference density; and
relatively reduce a current to energize the high-frequency-assisted element at a timing of the low-density region to be less than a current of the high-density region, in accordance with the low-density region or the high-density region in recording the data.

* * * * *